(12) United States Patent
Lehtiniemi (10) Patent No.: US 10,540,543 B2
(45) Date of Patent: Jan. 21, 2020

(54) HUMAN-COMPUTER-INTERACTION THROUGH SCENE SPACE MONITORING

(71) Applicant: Nokia Technologies Oy, Espoo (FI)

(72) Inventor: Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/577,901

(22) PCT Filed: Jun. 3, 2016

(86) PCT No.: PCT/FI2016/050398
§ 371 (c)(1),
(2) Date: Nov. 29, 2017

(87) PCT Pub. No.: WO2016/193550
PCT Pub. Date: Dec. 8, 2016

(65) Prior Publication Data
US 2018/0165514 A1 Jun. 14, 2018

(30) Foreign Application Priority Data

Jun. 3, 2015 (EP) ..................................... 15170564

(51) Int. Cl.
*G06K 9/00* (2006.01)
*G06F 3/01* (2006.01)
(52) U.S. Cl.
CPC .......... *G06K 9/00335* (2013.01); *G06F 3/011* (2013.01); *G06F 3/017* (2013.01); *G06K 9/00771* (2013.01)

(58) Field of Classification Search
CPC . G06F 3/011–3/014; G06F 3/017; G06F 3/03; G06F 3/0304–3/0325; G06K 9/00335–9/00355; G06K 9/00771; G06K 9/00778
See application file for complete search history.

(56) References Cited

U.S. PATENT DOCUMENTS

| | | | |
|---|---|---|---|
| 2011/0141009 A1* | 6/2011 | Izumi | G06F 3/017 345/156 |
| 2013/0181897 A1* | 7/2013 | Izumi | G06F 3/017 345/156 |
| 2014/0267004 A1 | 9/2014 | Brickner | 345/156 |
| 2015/0040040 A1 | 2/2015 | Balan et al. | 715/762 |
| 2015/0302617 A1* | 10/2015 | Shimura | G06K 9/00355 345/441 |

* cited by examiner

*Primary Examiner* — Nathan Danielsen
(74) *Attorney, Agent, or Firm* — Harrington & Smith (57) ABSTRACT

A method including causing computer implementation of the at least one virtual boundary in a monitoring space corresponding to a monitored scene space; processing sensor data to generate a response event when there is, relative to the at least one virtual boundary, a change in a portion of the monitored scene space; recognizing a first hand gesture relating to a first hand of a user in the monitored scene space and in response to recognizing the first hand gesture in the monitored scene space in relation to a portion of the virtual boundary enabling user location of the portion of the implemented computer-implemented virtual boundary and recognizing a second hand gesture relating to a second hand of the user in the monitored scene space and in response to recognizing the second hand gesture in the monitored scene space performing a command relating to a user located portion of the computer-implemented virtual boundary.

20 Claims, 5 Drawing Sheets

HUMAN-COMPUTER-INTERACTION THROUGH SCENE SPACE MONITORING

TECHNOLOGICAL FIELD

Embodiments of the present invention relate to monitoring a scene. In particular, they relate to automated monitoring of a scene.

BACKGROUND

Current monitoring systems, such as surveillance systems, may comprise one or more cameras for video recording, with or without audio recording, connected via wires or wirelessly to a hub that stores or enables storage of the data recorded from the scene. An operator may, in some examples, be able to use the hub to program settings for the cameras and/or the hub.

BRIEF SUMMARY

According to various, but not necessarily all, examples of the disclosure there is provided a method as claimed in any of claims 1-13.

According to various, but not necessarily all, examples of the disclosure there is provided an apparatus as claimed in claim 14.

According to various, but not necessarily all, examples of the disclosure there is provided an apparatus comprising: at least one processor; and at least one memory including computer program code the at least one memory and the computer program code configured to, with the at least one processor, cause the apparatus at least to perform a method as claimed in any of claims 1-13.

According to various, but not necessarily all, examples of the disclosure there is provided computer program code that, when performed by at least one processor, causes a method of at least one of claims 1-13 to be performed.

According to various, but not necessarily all, examples of the disclosure there is provided a computer program that, when run on a computer, performs: a method as claimed in any of claims 1-13.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

The system 100 described is a system that monitors at least one scene. The operation of the system can be controlled by a user within the scene by carrying out actions within the scene. For example, the user is able to control the system so that the user can perform commands relating to at least one virtual boundary monitored by the system.

Figure 1:
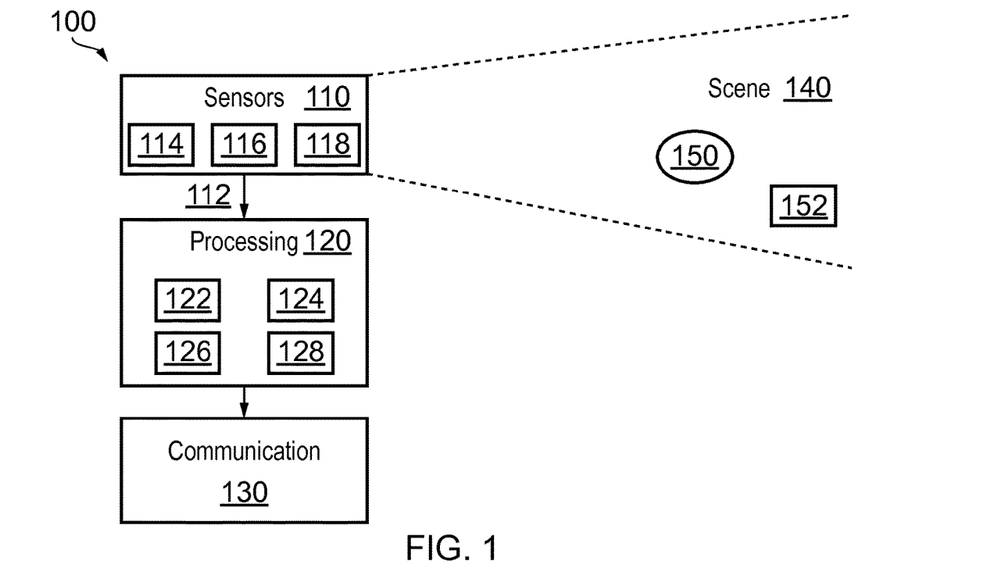
FIG. 1 schematically illustrates an example of a system.

FIG. 1 schematically illustrates a system 100 comprising: one or more sensors 110 configured to record sensor data 112 from a scene 140; a processing module 120 configured to process the sensor data 112 recorded from the scene 140 to recognise automatically events that occur in the scene 140 and to automatically take decisions as a consequence of the recognition; and a communication module 130 configured to communicate, when a decision to communicate is taken by the processing module 120.

Some but not necessarily all of the events that are recognised may relate to an object 152 or a particular object 152 in the scene 140. An object may be an inanimate object, an animal, a person or a particular person 150 in the scene 140. In some but not necessarily all examples of the system 100, the system 100 is a real-time recognition system and the automatic recognition and decision, if any, occur substantially at the same time as the sensor data 112 is recorded.

The system 100 may be used for surveillance, monitoring, assisted living, elderly care, virtual reality, patient monitoring, people flow analytics, retail or other applications. The system 100 may be used in businesses, public areas or at home. One expected use is as a home surveillance system.

The system 100 may enable a user to control monitoring, for example, when the user is a person 150 in the scene 140. The system 100 may enable a user to control recognition and/or a consequence of recognition, for example, when the user is a person 150 in the scene 140.

In some but not necessarily all examples, the system 100 may comprise a number of discrete apparatus. For example, the sensors 110 may be housed in one or more separate apparatus, the processing module 120 may be housed in one or more apparatus and the communication module 130 may be housed in one or more apparatus. Where a component or components of the system 100 are housed in discrete apparatus, those apparatus may be local or remote to each other and, where they are remote they may communicate, for example, over a network.

In some but not necessarily all examples, the system 100 may be housed in a single apparatus.

The sensors 110 are configured to record or enable recording of sensor data 112 from the scene 140.

A scene 140 may comprise static components that have, for example, fixed relative positions, such as for example static objects. These static objects have different static positions in the scene's three-dimensional space (scene space). A scene 140 may comprise moving components, such as for example a moving object. A moving object has different positions in the scene space over time. Reference to 'the scene' in relation to different sensor data 112 or different times implies a continuity of those static components of the scene 140 that are sensed, it does not necessarily imply a continuity of some or all of the dynamic components although this may occur.

The recording of sensor data 112 may comprise only temporary recording, or it may comprise permanent recording or it may comprise both temporary recording and permanent recording, Temporary recording implies the recording of data temporarily. This may, for example, occur during sensing, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The sensors 110 may be configured to transduce propagating waves, such as sound waves and/or light waves, to electrical signals encoding the propagating wave data from the scene 140 as sensor data 112.

In some but not necessarily all examples, the sensors 110 are fixed in space relative to the scene space 140. In other examples, the sensors 110 are movable or moving relative to the scene space 140.

In some, but not necessarily all embodiments, the sensors 110 are or comprise image sensors 114. An example of an image sensor 114 is a digital image sensor that is configured to operate as a camera. Such a camera may be operated to record static images and/or video images.

In some, but not necessarily all embodiments, cameras may be configured in a stereoscopic or other spatially distributed arrangement so that the scene 140 is viewed from different perspectives. This may enable the creation of a three-dimensional image and/or processing to establish depth, for example, via the parallax effect.

In some, but not necessarily all embodiments, the sensors 110 are or comprise audio sensors 116. An example of an audio sensor 116 is a microphone or microphones. Microphones may be configured in a stereoscopic or other spatially distributed arrangement such as a microphone array so that the scene 140 is sampled from different perspectives. This may enable three-dimensional spatial audio processing, that allows positioning of audio within the scene 140.

In some, but not necessarily all embodiments, the sensors are or comprise depth sensors 118. A depth sensor 118 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the scene 140 with light, preferably invisible light such as infrared light, with a spatially dependent pattern. Detection of a certain pattern by the receiver allows the scene 140 to be spatially resolved. The distance to the spatially resolved portion of the scene 140 may be determined by time of flight and/or stereoscopy (if the receiver is in a stereoscopic position relative to the transmitter).

In these 'passive' or 'non-active' examples of depth sensing the person 150 or object 152 to be sensed are passive and merely reflect incident light or sound waves emitted by a transmitter. However, 'active' examples, which require activity at the sensed object, may additionally or alternatively be used. As an example, a person 150 may carry a positioning apparatus that is configured to position the positioning apparatus within the scene space 140. The positioning apparatus may for example measure motion of the positioning apparatus from a reference position using accelerometers. Gyroscopes may optionally be used to determine orientation. Additionally or alternatively, the positioning apparatus may enable positioning via triangulation (trilateration) by transmitting to multiple receivers and/or receiving from multiple transmitters.

In the illustrated example, but not necessarily all examples, the processing module 120 comprises a memory sub-module 122, a processing sub-module 124, a recognition sub-module 126, and a control sub-module 128. While the 'modules' are described and illustrated separately they may be, although they need not be, separate or combined in different combinations. For example, the processing sub-module 124, the recognition sub-module 126, and the control sub-module 128 may be performed by the same circuitry or under the control of the same computer program. Alternatively one or more of the processing sub-module 124, the recognition sub-module 126, and the control sub-module 128 may be performed by dedicated circuitry or a dedicated computer program. The sub-modules may be performed using software, dedicated hardware or a mix of programmed hardware and software.

The memory sub-module 122 may be used to store unprocessed sensor data 111 and/or processed sensor data 112 (scene data), computer programs, scene space models and other data used by the processing module 120, although other sub-modules may have their own memories.

The processing sub-module 124 may be configured to process the sensor data 112 to determine scene data that is meaningful about the scene 140.

The processing sub-module 124 may be configured to perform image processing where the sensor data 110 comprises image data from a camera or cameras 114. The processing sub-module 124 may be configured to perform audio processing where the sensor data 110 comprises audio data from a microphone or microphones 116.

The processing sub-module 124 may be configured to perform automatically one or more of the following tasks using the sensor data 112 to create scene data that has potential meaning for the scene 140:
   use machine (computer) vision to perform one or more of:
   detect a (moving or stationary) object or person,
   classify a (moving or stationary) object or person, and/or
   track a (moving or stationary) object or person;
   use spatial analysis to perform one or more of:
   position a (moving or stationary) object in the scene space using depth determination; and/or
   create a map of the scene space; and/or
   use behaviour analysis to describe an event that occurs in the scene 140 as a potentially meaningful symbol.

An example of image processing is 'histogram of gradient features' analysis which creates a distribution of intensity gradients or edge directions for an image. The image may be divided into small connected regions (cells), and for each cell, a histogram of gradient directions or edge orientations is created for the pixels within the cell. The combination of these histograms then represents a descriptor.

An example of audio processing is 'mel-frequency cepstral coefficients' determination, spatial audio processing using, for example, audio beamforming techniques, audio event recognition or classification, speaker recognition or verification or speech recognition.

Motion detection may be achieved, for example, using differencing with respect to a background model (background subtraction) or with respect to a preceding image (temporal differencing), or using some other approach such as optical flow analysis using a vector-based approach.

Object classification may be achieved, for example, using shape-based analysis and/or motion-based analysis.

Classification of a person may be classification that an object is human or classification that an object is a particular human (identification). Identification may be achieved using an attribute or a combination of attributes that uniquely identifies a person within the set of possible persons. Examples of attributes include: biometric features that are or may be particular to a person such as their face or their voice: their shape and size; their behavior.

Object tracking may be achieved by labelling objects and recording the position in the scene 140 of the labelled object. The algorithm may need to deal with one or more of the following events: object entrance to the scene 140; object exit from the scene 140; object re-entrance to the scene 140; object occlusion; object merge. How to deal with these events is known in the art.

Object tracking may be used to determine when an object or person changes. For example, tracking the object on a large macro-scale allows one to create a frame of reference that moves with the object. That frame of reference can then be used to track time-evolving changes of shape of the object, by using temporal differencing with respect to the object.

This can be used to detect small scale human motion such as gestures, hand movement, facial movement. These are scene independent user (only) movements relative to the user.

The system may track a plurality of objects and/or points in relation to a person's body, for example one or more joints of the person's body. In some examples, the system 100 may perform full body skeletal tracking of a person's body.

The tracking of one or more objects and/or points in relation to a person's body may be used by the system 100 in gesture recognition and so on.

Behavior analysis requires describing an event that occurs in the scene 140 using a meaningful symbology. An event may be something that occurs at a spatio-temporal instance or it may be a spatio-temporal sequence (a pattern of spatio-temporal instances over time). An event may relate to motion of an object (or person) or interaction of a person and object.

In some, but not necessarily all implementations, an event may be represented by a putative symbol defined in terms of parameters determined from the machine (computer) vision analysis and/or the spatial analysis. These parameters encode some or more of what is happening, where it is happening, when it is happening and who is doing it.

The recognition sub-module 126 is configured to recognise a putative symbol encoding an event in the scene 140 as a meaningful symbol associated with a particular meaning.

The recognition sub-module 126 may be configured to recognize a putative symbol, defined in terms of parameters determined from the machine (computer) vision analysis and/or the spatial analysis, and produced by the processing sub-module 124 as having meaning. The recognition sub-module 126 may, for example, store or access a database of meaningful reference symbols and may use a similarity test to determine whether a putative symbol is 'similar' to a meaningful symbol.

The recognition sub-module 126 may be configured as a machine (computer) inference engine or other recognition engine such as an artificial neural network or clustering in the parameter space. The recognition sub-module may 126, in some examples, be trained, via supervised learning, to recognise meaningful symbols as similar to reference symbols.

The control sub-module 128 responds to the determination that a meaningful event has occurred in the scene 140 in dependence on the event:

a) If the putative symbol is similar to a response symbol, the meaningful event is a 'response' event, and the control sub-module 128 performs a response action.

In some but not necessarily all examples the action performed may be programmed by a user. In some but not necessarily all examples the programming may occur via motion of the user within the scene. Examples of actions performed may be the generation of an alert or notification.

The alert or notification may be provided via the communications module 130. The communications module 130 may communicate wirelessly, via radio waves or via a wired connection to a local or remote apparatus. Examples of such apparatus include but are not limited to displays, televisions, audio output apparatus, personal devices such as mobile telephone or personal computers, a projector or other user output apparatus.

In some but not necessarily all examples the response symbol may be programmed by a user. For example, a user may be able to program or teach a meaningful event that is represented by a meaningful response symbol. The response symbol, created by the user, may be added to the database of reference symbols or otherwise used to recognise a putative symbol as a meaningful symbol. In some but not necessarily all examples the programming may occur via motion of the user within the scene 140. Examples of meaningful events that are represented by meaningful symbols include particular actions or movements performed such as user input gestures.

b) If the putative symbol is similar to a user control symbol, the meaningful event is a 'user control' event, and the control sub-module 128 enables user control of monitoring and/or user control of the response.

For example, a user may be able to program or teach a meaningful response symbol that is added to the database of reference symbols. In some but not necessarily all examples the programming may occur via motion of the user within the scene 140.

For example, a user may be able to program or teach an action performed when the putative symbol is matched to a response symbol. Examples of actions performed may be the generation of an alert or notification.

Figure 2:
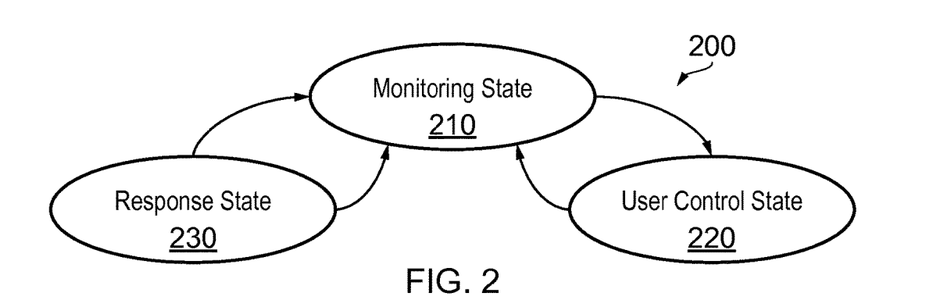
FIG. 2 illustrates an example of a state machine.

The operation of the processing module 120 may be further understood from FIG. 2 which illustrates a state machine 200 for the processing module 120. The state machine 200 has a monitoring state 210, a user control state 220 and an automatic response state 230.

In the monitoring state 210, the sensors 110 provide sensor data 112, and the processing sub-module 124 automatically processes the sensor data 112 (video and/or audio and/or depth) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140, the control sub-module 128 responds automatically depending on the event. If the meaningful event is a 'response' event, then the state machine 200 transitions to the response state 230 and the control sub-module 128 performs a response action. The response action may be associated with the response event. If the event is a 'user control' event, then the state machine 200 transitions to the user control state 220 and user control of monitoring and/or response is enabled. The enablement may be in a manner associated with that user control state 220.

A particular gesture user input may be used as a 'user control' event. A gesture user input is a gesture that has meaning to the system 100 as a user input. A gesture may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors 110. The body part may comprise the user's hand or part of the user's hand such as one or more fingers and thumbs. In other examples, the user input object may comprise a different part of the body of the user such as their head or arm. Three-dimensional movement may comprise motion of the user input object in any three orthogonal directions. The motion may comprise the user input object moving towards or away from the sensors 110 as well as moving in a plane parallel to the sensors or any combination of such motion. A gesture may be a non-contact gesture. A non-contact gesture does not contact the apparatus sensors at any time during the gesture. A gesture may be an absolute gesture that is defined in terms of an absolute displacement from the sensors 110. Such a gesture may be tethered, in that it is performed at a precise location in the scene space. Alternatively a gesture may be a relative gesture that is defined in terms of relative displacement during the gesture. Such a gesture may be un-tethered, in that it need not be performed at a precise location relative in the scene space and may be performed at a large number of arbitrary locations. A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement Δd with relative time Δt. A gesture may be performed in one spatial dimension (1D gesture), two spatial dimensions (2D gesture) or three spatial dimensions (3D gesture).

In some examples, the system 100 may track one or more objects and/or points in relation to a person's body in gesture recognition. For example, the system 100 may perform full skeletal tracking of a person's body in gesture recognition.

Implementation of the processor module 120 or part of the processor module 120 may be as controller circuitry. The controller circuitry 120 may be implemented in hardware alone, have certain aspects in software including firmware alone or can be a combination of hardware and software (including firmware).

Figure 3:
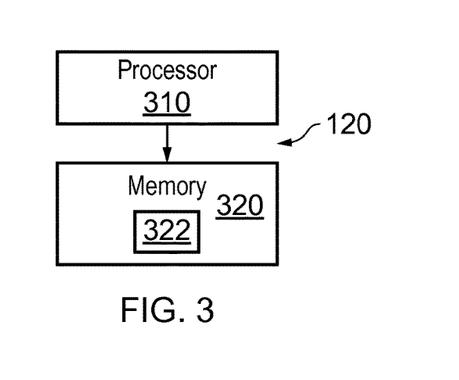
FIG. 3 illustrates an example of a processing module.

As illustrated in FIG. 3 the controller 120 may be implemented using instructions that enable hardware functionality, for example, by using executable computer program instructions 322 in a general-purpose or special-purpose processor 310 that may be stored on a computer readable storage medium (disk, memory etc) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 322 comprising computer program instructions (computer program code) that controls the operation of the processing module 120 when loaded into the processor 310. The computer program instructions, of the computer program 322, provide the logic and routines that enables the processing module to perform the methods discussed. The processor 310 by reading the memory 320 is able to load and execute the computer program 322.

Figure 12:
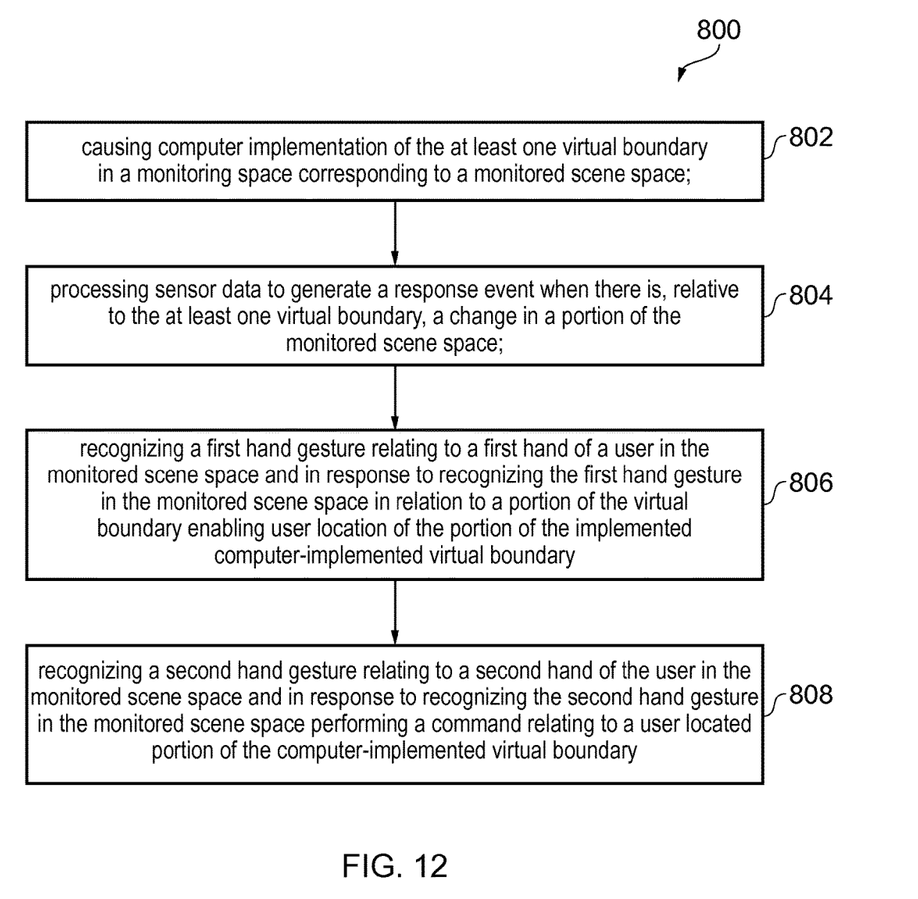
FIG. 12 illustrates an example of a method.

The system 100 may therefore comprise an apparatus 120 that comprises:

at least one processor 310; and at least one memory 320 including computer program code 322 the at least one memory 320 and the computer program code 322 configured to, with the at least one processor 310, cause the apparatus 120 at least to perform one or more of blocks 124, 126, 128 of FIG. 1 and/or one or more of the blocks of FIG. 12.

Figure 4:
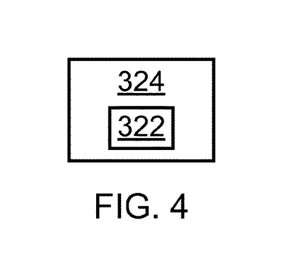
FIG. 4 illustrates an example of a delivery mechanism for a computer program.

As illustrated in FIG. 4, the computer program 322 may arrive at such an apparatus via any suitable delivery mechanism 324. The delivery mechanism 324 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 322. The delivery mechanism may be a signal configured to reliably transfer the computer program 322. The apparatus 120 may propagate or transmit the computer program 322 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The term 'computer implemented' should be understood to mean implemented at least in part by a computer.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks 124, 126, 128 illustrated in the FIG. 1 and/or the blocks illustrated in FIG. 12 may represent steps in a method and/or sections of code in the computer program 322. The illustration of a particular order to the blocks does not necessarily imply that there is a required or preferred order for the blocks and the order and arrangement of the block may be varied. Furthermore, it may be possible for some blocks to be omitted.

Figure 5:
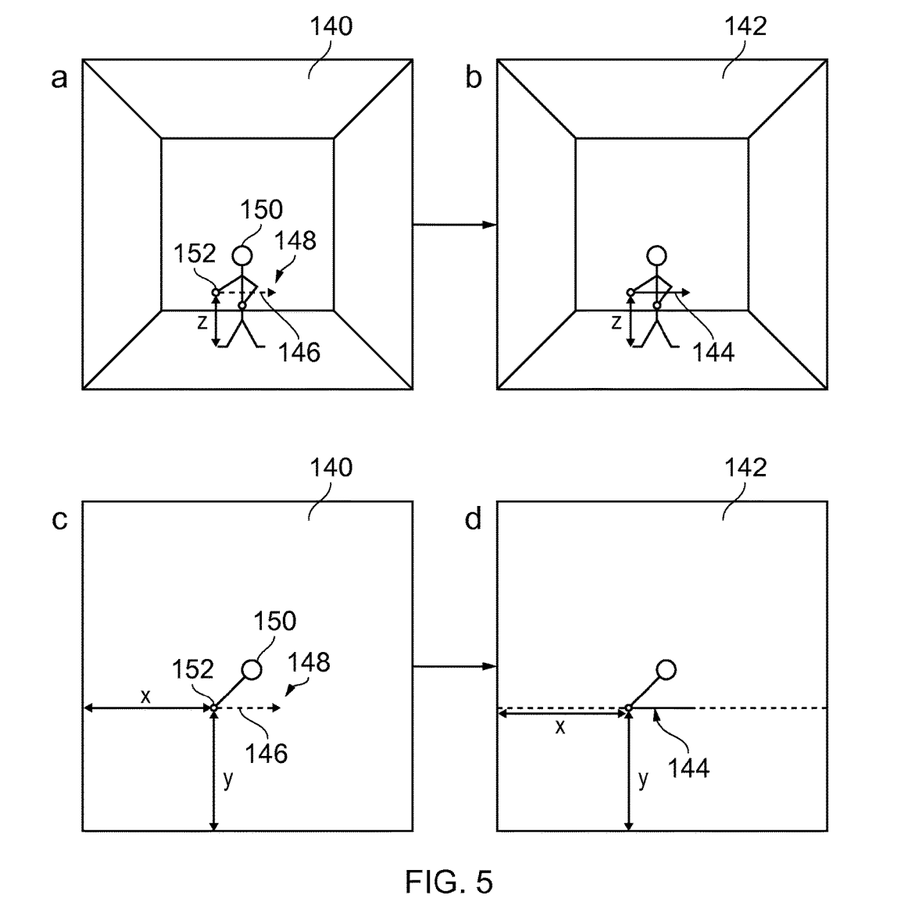
FIG. 5 illustrates an example of operation of the system.

FIG. 5 illustrates an example of operation of the system 100. Part a in the example of FIG. 5 illustrates a scene 140. The scene 140 is a real-world scene. The scene 140 comprises a three-dimensional space and may therefore be considered a scene space 140. The scene space 140 is monitored by the system 100. The scene space may therefore be considered a monitored scene space 140. In the example of FIG. 5 the monitored scene space 140 is a room comprising four walls, a ceiling and a floor.

In some examples the monitored scene space 140 may comprise no boundaries. Additionally or alternatively in examples the monitored scene space 140 may comprise a plurality of rooms that may or may not be spatially connected.

In the example of FIG. 5 a person 150, a user, is standing in the monitored scene space 140. The person 150 is performing at least one gesture user input 146 to define at least one computer-implemented virtual boundary 144. The gesture user input 146 may be referred to as a gesture 146 and may be as described above with reference to FIG. 2. The gesture 146 may be considered a boundary indication gesture 146.

Gesture-Defined Boundary

In the illustrated example the person 150 is performing a gesture 146 to define a single computer-implemented virtual boundary 144.

The gesture 146 comprises movement of one or more user input objects, which may be body parts. In the example of FIG. 5 the gesture 146 comprises the person 150 moving 148 one or more user input object 152.

In examples, the movement 148 may comprise any motion in one spatial dimension, two spatial dimensions or three spatial dimensions and may take any form.

Part c of the example of FIG. 5 illustrates an overhead view of the monitored scene space 140 in which the person 150 is illustrated making the gesture 146 to define a computer-implemented virtual boundary 144.

As can be seen in parts a and c of the example of FIG. 5, the gesture 146 has a position having Cartesian orthogonal coordinates $(x_i(t), y_i(t), z_i(t))$ in the scene 140 for each user input object i, at time t. In this example, $x_i(t)$ is measured from the left wall, $y_i(t)$ is measured from the front wall and $z_i(t)$ is measured from the floor. It will be understood that other coordinate systems may be used and that different orientations of the Cartesian coordinate system may be used For simplicity of illustration in FIG. 5, the gesture 146 comprises motion of one user input object 152 in one spatial dimension—as the value of x changes along the path 148 and the values of y and z remain constant. In other examples the values of x, y and/or z may vary in any way with movement 148 from any starting position in the monitored scene space 140. Also multiple user input objects may be used.

Parts b and d of the example of FIG. 5 illustrate a monitoring space 142. The monitoring space 142 comprises a virtual representation of the monitored scene space 140 created and used by the system 100. The monitoring space 142 may be formed, for example, from sensor data 112 provided by the sensors 110, such as received image data and/or audio data and/or depth data.

Parts b and d illustrate respectively the same views as illustrated in parts a and c of FIG. 5.

In some examples the system 100 may use information of the geometry of the monitored scene space 140 to form the monitoring space 142. For example, the system 100 may use a three dimensional model of the monitored scene space 140 in the formation of the monitoring space 142. The three dimensional model of the monitored scene space 140 may be created by the system 100 and/or may be received by the system 100. Methods for creating a three dimensional model of the monitored scene space 140 are known in the art.

The system 100 may use the monitoring space 142 to monitor the scene space 140. For example, the system may use the monitoring space 142 to implement and monitor at least one virtual boundary 144.

As indicated by the arrows between parts a and b and parts c and d of FIG. 5 there is a correspondence between the monitoring space 142 and the monitored scene space 140. In some examples there may be a one to one mapping between the monitoring space 142 and the monitored scene space 140.

In other examples there may be a scale invariant transformation between the monitored scene space 140 and the monitoring space 142.

The system 100 recognizes the gesture 146 performed by the person 150 and in response implements at least one virtual boundary 144 in the monitoring space 142. In some examples, recognizing the gesture 146 may comprise processing sensor data 112, such as image data and/or depth data. For example, the system 100 may analyze one or more video feeds.

In examples, a shape and position of the virtual boundary 144 in the monitoring space is determined, at least partially, the gesture 146 in the monitored scene space 140 and the virtual boundary 144 is located in the monitoring space at a corresponding location equivalent to the location of the path 148 in the monitored scene space 140. The virtual boundary is virtual because it exists in the monitoring space 142. The virtual boundary is a boundary because it imposes a limit within the three-dimensional monitoring space 142 that operates as a trigger.

The gesture 146 may be an absolute gesture or tethered gesture as described above in relation to FIG. 2.

Response Event

The system 100, may process sensor data 112 to generate a response event when there is, relative to the at least one virtual boundary 144, a change in a portion of the monitored scene space 140 that causes a change in a portion of the monitoring space 142 demarcated by the virtual boundary.

A response event is something that happens in response when there is, relative to the at least one virtual boundary 144, a change in a portion of the monitored scene space 140 that causes a change in a portion of the monitoring space 142 demarcated by the virtual boundary.

For example, the system 100 may process data 112 provided by the sensors 110, such as audio and/or image data, to generate the response event. The system may analyze one or more audio and/or video feeds to generate the response event. In some examples processing the sensor data 112 to generate the response event may be considered monitoring the virtual boundary 144.

In examples the same sensor, such as a camera, may be used in recognition of the gesture 146 defining the at least one virtual boundary 144 and for monitoring the at least one virtual boundary 144.

In some examples, processing sensor data 112 to generate the response event may comprise processing sensor data 112 to monitor the virtual boundary 144 to detect activity across the virtual boundary 144 and/or activity within a threshold of the virtual boundary 144. For example, the system 100 may process audio and/or image and/or depth data to monitor the virtual boundary 144 to detect activity across the virtual boundary 144 or within a threshold of the virtual boundary 144.

Boundary Interaction

From the foregoing it will be understood that the system 100 is configured to cause computer implementation of the at least one virtual boundary 144 in a monitoring space 142 corresponding to a monitored scene space 140 and to process sensor data 112 to generate a response event when there is, relative to the at least one computer-implemented virtual boundary 144, a change in a portion of the monitored scene space 140.

The system 100 is additionally configured to recognize a first hand gesture 149 relating to a first hand $152_1$ of a user 150 in the monitored scene space 140 and in response to recognizing the first hand gesture 149 in the monitored scene space 140 in relation to a portion of the computer-implemented virtual boundary 144 enable user location of a portion of the implemented computer-implemented virtual boundary 144.

The system 100 is additionally configured to recognize a second hand gesture 151 relating to a second hand $152_2$ of the user 150 in the monitored scene space 140 and in response to recognizing the second hand gesture 151 in the monitored scene space 140 perform a command relating to the user located portion of the computer-implemented virtual boundary 144.

Command Type

The command may be an information command that enables the user 150 to control the system 100 to provide to the user 150 information relating to the computer-implemented virtual boundary 144.

The command may be a boundary adaptation command that enables the user 150 to control the system 100 to adapt the computer-implemented virtual boundary 144. The adaptation of the computer-implemented virtual boundary 144 may comprise modifying one or more of: a shape of the computer-implemented virtual boundary 144, a position of the computer-implemented virtual boundary 144 and an orientation of the computer-implemented virtual boundary 144. The system 100 then processes sensor data 112 to generate a response event based on the modified computer-implemented virtual boundary 144. The response event is produced when there is, relative to the modified computer-implemented virtual boundary 144, a change in a portion of the monitored scene space 140.

The adaptation of the computer-implemented virtual boundary 144 may alternatively comprise deletion of the computer-implemented virtual boundary 144. The system 100 does not then processes sensor data 112 to generate a response event based on the computer-implemented virtual boundary 144.

In examples, such as those described below, the first hand $152_1$ may be used consistently for boundary location and for selection but not for effecting commands and the second hand $152_2$ may be used consistently for effecting commands but not for boundary location and selection.

In examples, such as those described below, the second hand gesture 151 is part of a two-handed gesture 148 in the monitored scene space 140. The two-handed gesture 148 comprises a first hand gesture 149 and the second hand gesture 151. In some but not necessarily all examples, the command, performed in response to recognizing the second hand gesture 151 in the monitored scene space 140, is dependent upon the two-handed gesture 148.

The process of recognizing a two-handed gesture 148 may comprise processing sensor data 112 (e.g. image data and/or depth data) to track motion of parts of the user's body in the monitored scene space 140. A two-handed gesture 148 may be a gesture that involves relative movement of both hands of one person relative to one or more of: a wrist joint and/or an elbow joint and/or a shoulder joint.

In some but not necessarily all examples, the command, performed in response to recognizing the second hand gesture 151 in the monitored scene space 140, is dependent upon a state of the first hand $152_1$, concurrent with the second hand gesture 151.

Figure 6:
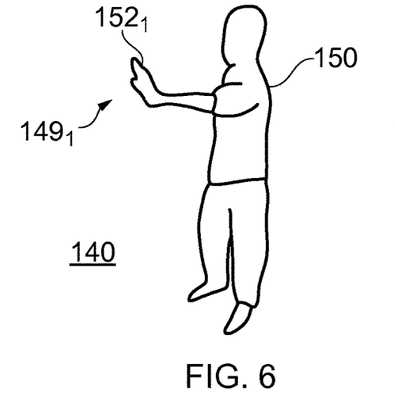
FIG. 6 illustrates an example of how a computer-implemented virtual boundary may be located by the user moving a first hand in the monitored scene space.

FIG. 6 illustrates an example of how a computer-implemented virtual boundary 144 may be located by the user moving a first hand $152_1$ in the monitored scene space 140.

The system 100 processes the sensor data 112 and recognizes a first hand gesture 149 relating to a first hand $152_1$ of a user in the monitored scene space 140. The system 100, in response to recognizing the first hand gesture 149 in the monitored scene space 140 in relation to a portion of the computer-implemented virtual boundary 144 enables user location of that portion of the implemented computer-implemented virtual boundary 144.

In this example, the first hand $152_1$ in first hand gesture 149 has a first state (palm open and fingers upwards in this example but not necessarily all examples) and the first hand gesture 149 may be labeled $149_1$ in the figures to reference that the first hand $152_1$ is in the first state.

The system 100 recognizes the first hand gesture $149_1$ relating to the first hand $152_1$ of the user in the first state. The system 100, in response to recognizing the first hand gesture $149_1$, in the first state, in relation to a portion of the computer-implemented virtual boundary 144 enables user location of that portion of the implemented computer-implemented virtual boundary 144.

"User location" of something means discovery by a user of a location of that thing. The use of "user located" as an adjective describing something means that discovery by a user of a location of that thing has occurred.

Optionally, enabling user location of the portion of the computer-implemented virtual boundary 144 comprises the system 100 providing user guidance to locate the first hand 152₁ of the user 150 in the monitored scene space 140 at the computer-implemented boundary 144 in the corresponding monitoring space 142. The system 100 may, for example, give directions to the user 150 via synthesized speech, sound, or haptic feedback projected in the monitored scene space 140 or via a user's mobile device.

Optionally, enabling user location of the portion of the computer-implemented virtual boundary 144 comprises the system 100 providing feedback to the user when the first hand 152₁ of the user in the monitored scene space 140 is at the computer-implemented boundary 144 in the corresponding monitoring space 142. The feedback may be provided when the user's hand intercepts the computer-implemented virtual boundary 144. The system 100 may, for example, provide audio or haptic feedback that is projected in the monitored scene space 140 or via a user's mobile device.

Adaptation Mode

Having located the computer-implemented virtual boundary 144, the user may enter an adaptation mode.

Figure 7:
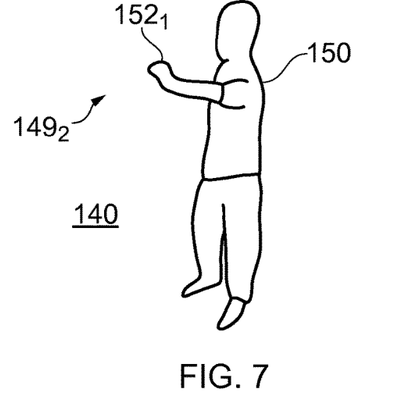
FIG. 7 illustrates using a gesture to enter an adaptation mode.

As illustrated in FIG. 7, the first hand gesture 149 is changed so that the first hand 152₁ is in a second state (a clenched first) different to the first state (fingers upwards and palm open).

The first hand gesture 149 is labeled 149₂ in the figures to reference that the first hand 152₁ is in the second state.

The system 100 is configured to recognize the first hand gesture 149₂ relating to first hand 152₁ in the second state. In response to recognizing a first hand gesture 149₂ that has the first hand 152₁ of the user first in the first state (FIG. 6) and then in the second state (FIG. 7), the system 100 performs a command enabling an adaptation mode for the computer-implemented virtual boundary 144.

Feedback may be provided when the adaptation mode is enabled. The system 100 may, for example, provide audio or haptic feedback projected in the monitored scene space 140 or via a user's mobile device.

In examples, such as those described below in relation to FIGS. 8, 9, 10, the second hand gestures 151 are part of two-handed gestures 148 in the monitored scene space 140.

The two-handed gestures 148 comprise the first hand gesture 149₂ that has the first hand 152₁ of the user in the second state, and a second hand gesture 151. The system 100 is configured to recognize the second hand gesture 151 and in response to recognizing the second hand gesture 151 in the monitored scene space 140 performs an adaptation command relating to the user located computer-implemented virtual boundary 144.

In these examples, in the adaptation mode, the system 100 recognizes, in the monitored scene space 140, a two-handed gesture 148 in which the first hand gesture 149₂ maintains the first hand 152₁ in the second state and stationary during the second hand gesture. The second hand gesture 151 is different to the first hand-gesture 149₂. The system 100 performs an adaptation command dependent on the second hand gesture 151.

Figure 8A:
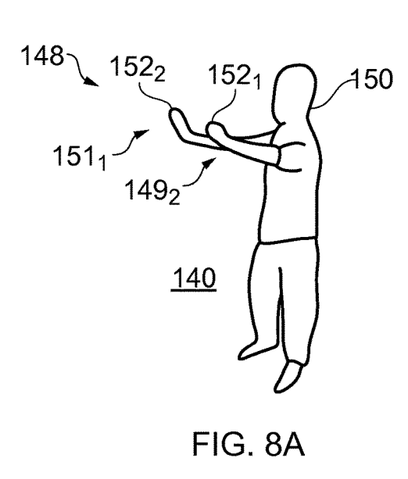
FIGS. 8A, 8B, 8C illustrate controlling the system, using gestures, to move the computer-implemented virtual boundary.
Figure 8B:
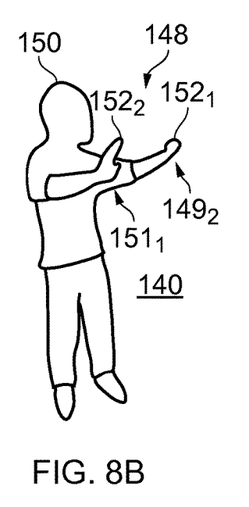
Figure 8C:
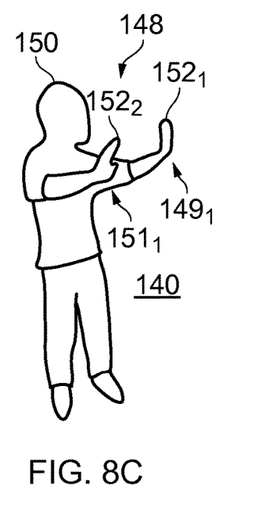

FIGS. 8A, 8B, 8C illustrate controlling the system 100 to move the computer-implemented virtual boundary 144 using gestures. In this example, a size and shape of the computer-implemented virtual boundary 144 is maintained.

FIG. 8A illustrates a two-handed gestures 148 comprising a first hand gesture 149₂ that has the first hand 152₁ of the user in the second state (first hand 152₁ is stationary and forms a first) and a concurrent, second hand gesture 151 that has the second hand 152₂ of the user in a first state (palm open and fingers pointing upwards). The first state of the second hand 152₂ in this two-handed gesture 148 disambiguates the gesture and indicates that movement of the computer-implemented virtual boundary is being controlled by the user.

The system 100 is configured to recognize this combination of first hand gesture 149₂ and second hand gesture 151₁ and in response to recognizing this second hand gesture 151, in the combination, monitors changes in the two-handed gesture 148.

FIG. 8B illustrates how a two-handed gestures 148 is then used to move the computer-implemented virtual boundary 144.

The form of the two-handed gesture 148 is maintained but its position and orientation is changed.

The first hand gesture 149₂ is maintained. The first hand 152₁ of the user is still in the second state (fist).

The second hand gesture 151 is maintained. The second hand 152₂ of the user is still in the first state (palm upwards)

The system 100 is configured to recognize the positions of the first hand 152₁ and the second hand 152₂ of the user 150. The positions of the first hand 152₁ and the second hand 152₂ of the user 150 control a position and orientation of the computer-implemented virtual boundary 144. For example, a portion of the computer-implemented virtual boundary 144 may be aligned with a vector between the position of the first hand 152₁ and the position of the second hand 152₂ of the user 150.

FIG. 8C illustrates how a two-handed gestures 148 is then used to enable use of the modified computer-implemented virtual boundary 144.

The form of the two-handed gesture 148 is changed to terminate the adaptation mode.

The first hand gesture 149₂ is changed. The first hand 152₁ of the user is changed from the second state (first) to the first state (palm upwards). This creates first hand gesture 149₁.

The system 100 is configured to recognize the change in state of the first hand 152₁ and store the currently adapted computer-implemented virtual boundary as a new replacement computer-implemented virtual boundary 144. The change in state of the first hand 152₁ fixes the computer-implemented virtual boundary 144 in place.

Feedback may be provided when the adaptation mode is terminated. The system 100 may, for example, provide audio or haptic feedback projected in the monitored scene space 140 or via a user's mobile device.

Figures 9A, 9B:
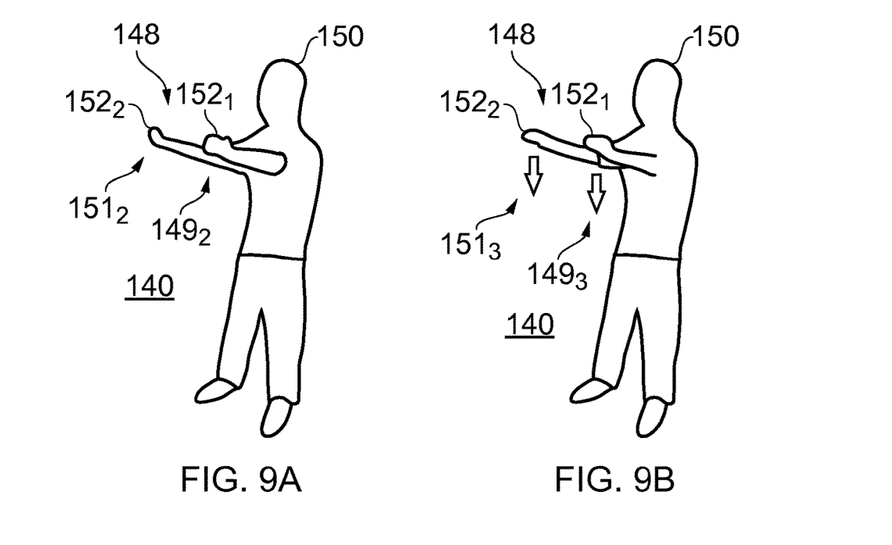
FIGS. 9A, 9B illustrate controlling the system, using gestures, to delete the computer-implemented virtual boundary.

FIGS. 9A, 9B illustrate controlling the system 100 to delete the computer-implemented virtual boundary 144 using gestures.

FIG. 9A illustrates a two-handed gesture 148 comprising a first hand gesture 149₂ that has the first hand 152₁ of the user in the second state (first hand 152₁ is stationary and forms a first) and a concurrent, second hand gesture 151 that has the second hand 152₂ of the user in the second state (second hand 152₂ is stationary and forms a fist). The second state of the second hand 152₂ in this two-handed gesture 148 disambiguates the gesture and indicates that deletion of the computer-implemented virtual boundary 144 is being controlled by the user 150.

The system 100 is configured to recognize this combination of first hand gesture 149₂ and second hand gesture 1512 and in response to recognizing this combination monitors changes in the two-handed gesture 148.

FIG. 9B illustrates how a two-handed gesture 148 is then used to delete the computer-implemented virtual boundary 144.

The two-handed gesture 148 comprises a first hand gesture $149_3$ and a second hand gesture $151_3$ performed simultaneously.

The first hand gesture $149_3$ comprises moving the first hand $152_1$, while in the second state (fist), downwards. The second hand gesture $151_3$ comprises moving the second hand $152_2$, while in the second state (fist), downwards.

The system 100 is configured to recognize the state and movement of the first hand $152_1$ and the second hand $152_2$ of the user 150. When both hands are recognized as being moved downwards while they are in the second state, the system 100 responds by deleting the computer-implemented virtual boundary 144. It is then no longer used to produce response events.

Figure 10:
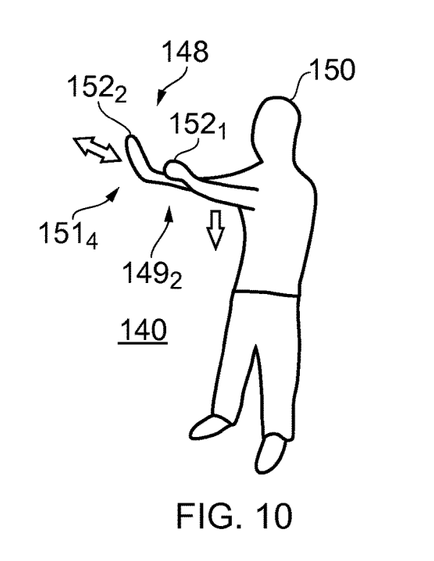
FIG. 10 illustrates controlling the system, using gestures, to provide options for adapting the computer-implemented virtual boundary.

FIG. 10 illustrates controlling the system 100, using gestures, to provide options for adapting the computer-implemented virtual boundary 144.

FIG. 10 illustrates a two-handed gesture 148 comprising a first hand gesture $149_2$ that has the first hand $152_1$ of the user in the second state (first hand $152_1$ is stationary and forms a first) and a concurrent, second hand gesture $151_4$ that has the second hand $152_2$ of the user in the first state (first hand $152_1$ is palm open, fingers pointing upwards) and the second hand $152_2$ is moving from side-to-side in a swiping movement. The second state and movement of the second hand $152_2$ in this two-handed gesture 148 disambiguates the gesture and indicates that access to a menu of user selectable options is required.

The system 100 is configured to recognize the movements and states of the first hand $152_1$ and the second hand $152_2$ of the user. The system 100 is configured to recognize the combination of the first hand gesture $149_2$ and the second hand gesture $151_4$ and in response to recognizing this combination monitors changes in the two-handed gesture 148.

Each side-to-side swiping motion of the second hand $152_2$ causes the system 100 to navigate a menu of boundary adaptation options to the next option in the menu. The system then outputs information identifying that option.

An option may be selected by a user by changing the form of the two-handed gesture 148. For example, the second hand gesture 151 may be changed so that the second hand $152_2$ of the user is in the second state (first) (see FIG. 9A).

Once an option has been selected, the user may perform further gestures to provide commands relating to the selected option.

For example, one option may be 'boundary position' and a further user gesture or gestures is recognized by the system 100 to provide commands for repositioning the computer-implemented virtual boundary 144.

For example, one option may be 'boundary orientation' and a further user gesture or gestures is recognized by the system 100 to provide commands for reorienting the computer-implemented virtual boundary 144.

For example, one option may be 'boundary shape' and a further user gesture or gestures is recognized by the system 100 to provide commands for re-shaping the computer-implemented virtual boundary 144.

Information Mode

Referring back to the description of FIG. 6, having located the computer-implemented virtual boundary 144, the user may enter an information mode.

Figure 11:
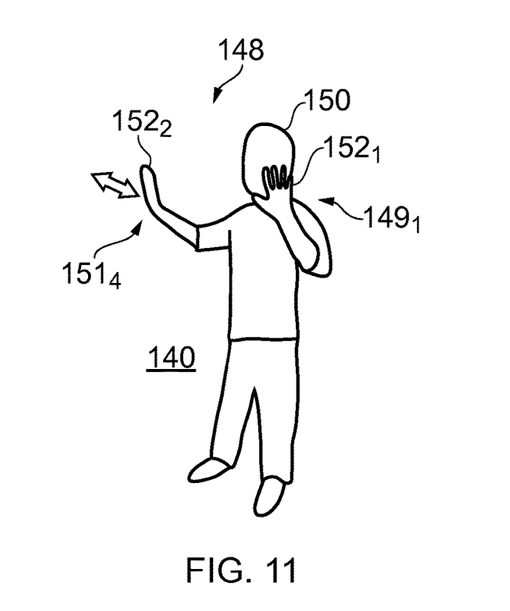
FIG. 11 illustrates using a gesture to enter an information mode.

As illustrated in FIG. 11, the first hand gesture 149 is not changed so that the first hand $152_1$ remains in the first state (fingers upwards and palm open) while a second hand gesture 151 is performed. The first hand gesture 149 is labeled $149_1$ in the figure to reference that the first hand $152_1$ is in the first state.

The system 100 is configured to recognize a second hand gesture 151 relating to second hand $152_2$ of the user in the monitored scene space 140 and in response to recognizing the second hand gesture 151 in the monitored scene space 140 performing an information command relating to a user located portion of the computer-implemented virtual boundary 144. In response to such recognition, the system 100 is configured to perform a user information command relating to the located portion of the computer-implemented virtual boundary 144 that is dependent on the second hand gesture.

For example, the system 100 may be configured to recognize, in the monitored scene space 140, a two-handed gesture 148 comprising a first hand gesture $149_1$ that has the first hand $152_1$ of the user in the first state (first hand $152_1$ is palm open, fingers pointing upwards) and a concurrent, second hand gesture $151_4$ that has the second hand $152_2$ of the user 150 in the first state (first hand $152_1$ is palm open, fingers pointing upwards) and the second hand $152_2$ is moving from side-to-side in a swiping movement. The first state of the first hand $152_2$ in this two-handed gesture 148 disambiguates the gesture and indicates that access to a menu of boundary information options is required.

Each side-to-side swiping motion of the second hand $152_2$ causes the system 100 to navigate a menu of boundary information options to the next option in the menu. The system then outputs information for that option.

An option may be selected automatically or by a user 150 by changing the form of the two-handed gesture 148. For example, the second hand gesture 151 may be changed so that the second hand $152_2$ of the user is in the second state (fist).

One option may provide information on who made the last boundary interception, another option may provide the total number of boundary interceptions, another option may provide the number of boundary interceptions by a particular person.

In the examples, given in relation to Figs 6, 7, 8, 9, 10, 11, it has been necessary to describe particular gestures and particular states of hands. It will be appreciated that many other different gestures may be used. It will be appreciated that many other different hand states may be used.

In some but not necessarily all examples, a user may program the system 100 to configure the system 100 to recognize particular gestures as the above described two-handed gestures 148, first hand gestures 149 and second hand gestures 151.

In some but not necessarily all examples, a user may program the system 100 to configure the system 100 to recognize particular gestures as the first state and/or second state of the first hand $152_1$ and/or above the first state and/or second state of the second hand $152_2$.

State Machine

It will be understood from the foregoing that two-handed gestures 148 may be used to transition between states in a state machine, and that the outcome following a particular two-handed gesture depends not only on the particular two-handed gesture 148 but also the current state of the state-machine and also the design of the state-machine which determines the post-transition state.

Feedback

The system 100 may provide feedback to a user to confirm that the system 100 has recognized a gesture 146 and has implemented the virtual boundary 144. The feedback may comprise any suitable feedback, for example audio and/or visual and/or tactile feedback and so on. Additionally or alternatively the system 100 may send one or more messages to a device or devices to inform the user that the system 100 has implemented the virtual boundary 144.

Verification

The system 100 may allow a user to verify that the one or more virtual boundaries 144 have been implemented without generating a response event.

For example, the a user may define a virtual boundary 144 using a gesture 146 at a location in the monitored scene space 140 and may then interact with the location in the monitored scene space 140 to verify that the virtual boundary 144 is "in place". In examples the user may move at least a part of his body, such as his hand, through the location in the monitored scene space and the system 100 may provide feedback to confirm that the user has touched and/or crossed the virtual boundary 144. Any suitable feedback may be provided, for example, audio and/or visual and/or tactile feedback. Additionally or alternatively the system 100 may send at least one message to a device or devices of the user.

In examples the system 100 may begin to process sensor data 112 to generate the response event after the user has verified the virtual boundary 144. For example, the system 100 will not generate an alert and/or increment a counter until after the user has verified the virtual boundary 144.

Response Event

The response event may comprise providing feedback, for example using the communication module 130. In some examples the feedback may comprise one or more alerts. The one or more alerts may comprise any form of alert such as audio and/or visual alerts. Additionally or alternatively, the feedback may comprise providing one or more messages to an apparatus such as a mobile telephone, tablet, laptop computer, desktop computer and so on.

In some examples, the response event may additionally or alternatively comprise incrementing a counter. For example, the system 100 may monitor the number of times there is a boundary interaction such as an object 152 touching and/or crossing and/or approaching within a threshold of the virtual boundary 144. In addition or alternatively the system 100 may monitor the direction of boundary interactions, such as the direction of boundary crossings. The system 100 may be configured to provide statistics on boundary interactions.

In some examples the system 100 may be used to monitor how often an elderly person goes to the bathroom and/or medicine cabinet, how often a child or children access or go near a refrigerator, monitoring people in a public space and so on.

A user of the system 100, such as person 150, may configure the response event. For example, a user may perform one or more additional gestures 146 that are recognized by the system 100 to configure the response event. In addition or alternatively the user may provide input to the system 100 to configure the response event using a device such as a tablet or mobile phone.

The system 100, in some examples, may process sensor data 112 to generate a response event when there is, relative to the virtual boundary 144, a change in a portion of the monitored scene space 140 in relation to any object 152. For example, the system may generate a response event when any object 152 crosses, touches and/or comes within a threshold of the virtual boundary 144. Such virtual boundaries 144 may be considered general virtual boundaries 144.

In other examples, the system may process sensor data 112 to generate a response event when there is, relative to the virtual boundary 144, a change in a portion of the monitored scene space 140 in relation to one or more user specified objects 152.

Object Specification

For example, after performing the gesture 146 to define at least one virtual boundary 144, a user 150 of the system 100 may perform a gesture 146 to indicate to the system 100 one or more objects 152. For example, the user 150 may point to the one or more objects 152 using his hand or a mobile device and/or may position the object or objects in a viewfinder of a device.

In other examples, the gesture 146 indicating the one or more objects may be performed before the gesture 146 defining the virtual boundary 144.

The system 100 may recognize the gesture 146 indicating the one or more objects 152 and in response the system 100 may generate a response event only when there is a change in a portion of the monitored scene space 140, relative to the virtual boundary 144, in relation to the indicated objects 152. For example, the system 100 may generate a response event only when one of the indicated objects 152 crosses, touches and/or comes within a threshold of the virtual boundary 144. Such virtual boundaries 144 may be considered object specific virtual boundaries.

With reference to the preceding examples, the person 150 may perform the gesture 146 to define the virtual boundary 144 and the system 100 may recognize the gesture 144 and implement the virtual boundary 144. The person 150 may then perform a further gesture, such as pointing to himself. The system recognizes the further gesture and monitors the virtual boundary 144 only in relation to the person 150. For example, the system 100 may generate a response event such as an alert and/or increment a counter when the person 150 crosses, touches and/or comes within a threshold of the virtual boundary 144 but not when any other object 150 crosses, touches and/or comes within threshold of the virtual boundary 144.

Boundary Definition

In some examples, a user, such as the person 150, may perform an initial gesture 146 to allow the gesture 146 to define at least one computer-implemented virtual boundary to be recognized by the system 100.

For example, the person 150 may perform a gesture 146 to place the system 100 in the user control state 220 to allow the user to perform the boundary indication gesture 146. In some examples, the gesture 146 to place the system 100 in the user control state may be/comprise a hand clap detected by audio, and/or a gesture 146 which can be detected using depth data.

In examples, the system 100 recognizes the initial gesture 146 and goes into a boundary recognition mode ready to recognize one or more boundary indication gestures. For example, a user, such as person 150, may point to a camera of system 100, to indicate that he is going to perform a boundary indication gesture 146. The system 100 may provide feedback, such as audio or visual feedback, to the user to confirm that the system 100 is in boundary indication mode.

In some examples, the user may then perform a gesture 146 to define at least one computer-implemented virtual boundary 144.

In some examples, the system 100 may be equipped with one or more projectors and/or lasers configured to project the virtual boundary 144 in the monitored scene space 140 using augmented reality techniques. Additionally or alternatively the user may observe the virtual boundary using augmented reality on one or more devices such as glasses.

In some examples a user, such as person 150, may perform a gesture 146 and the system 100 recognizes the gesture 146. In response the system 100 temporarily allows for one or more objects 152, such as person 150, to approach, touch and/or cross the virtual boundary without generating a response event. In examples, the change may be spatially temporary and the system 100 may allow a number of approaches/touches/crossings of the virtual boundary without generating the response event. The number of approaches/touches/crossings may be predefined or may be configured by a user, for example using a gesture 146 and/or one or more other inputs.

In examples the change may temporally limited and the system 100 may allow approaching, touching and/or crossing of the virtual boundary 144 for an amount of time. In examples the amount of time may be predefined or may be configured by a user, for example using a gesture 146 and/or one or more other inputs.

In some examples, a gesture 146 such as a gesture 146 to change a virtual boundary 144 may be spatially restricted. For example, the system 100 may only recognize such a gesture 146 if it is performed in a predefined area of the monitored scene space. In examples the system 100 will recognize a gesture 146 to change a virtual boundary 144 only if it is performed above a certain height (at a location having a z value above a threshold) to prevent children, for example, from changing a virtual boundary 144.

Additionally and/or alternatively a gesture 146, such as a gesture 146 to change a virtual boundary 144 may be recognized by the system 100 only when performed by a certain person/people. The person/people authorized to make a particular gesture 146 may be indicated to the system 100 using a gesture and/or one or more additional inputs. For example a user may point at the authorized person/people and/or point a mobile device at the authorized person/people and/or position the authorized person/people in a viewfinder of a device.

For example after defining the virtual boundary 144 the person 150 may use his finger to draw a circle around his face to indicate to the system 100 that only he is allowed to change the virtual boundary 144.

Conditionality

In some examples a virtual boundary 144 may be conditionally monitored and/or conditionally enabled/disabled. For example, the system 100 may process sensor data 112 to generate a response event when there is, relative to the virtual boundary 144, a change in a portion of the monitored scene space 140 when one or more criteria are satisfied but does not process sensor data 112 to generate the response event otherwise.

The criteria may be predefined and/or may be configured by a user using a gesture and/or one or more additional inputs.

In examples any criterion/criteria may be used. For example, any temporal and/or physical criteria may be used. In examples, a virtual boundary 144 may be conditionally monitored dependent upon time of day and/or day of week and/or week of month and/or month of year and/or independence upon the presence of one or more objects 152 in the monitored scene space 140.

For example, after defining the virtual boundary 144 the person 150 may perform a gesture 146 to indicate to the system 100 that the virtual boundary 144 should be monitored only when he is not in the monitored scene space 140.

The system 100 recognizes the gesture 146 and subsequently monitors the virtual boundary 144 only when the person 150 is not in the monitored scene space 140.

In some examples the virtual boundary may be monitored when the person 150 leaves the scene space 140 and may be permanently removed when he returns to the scene space 140.

In other examples the virtual boundary 144 may be stored by the system 100 and enabled every time the person 150 leaves the monitored scene space 140 and disabled every time he returns to the monitored scene space 140. Any number of virtual boundaries 144 may be stored by the system 100.

Method

FIG. 12 illustrates an example of a method 800. The method 800 may be performed by the system 100.

At block 802, the method 800 comprises: causing computer implementation of the at least one virtual boundary 144 in a monitoring space 142 corresponding to a monitored scene space 140.

A shape and position of the computer-implemented virtual boundary 144 may be defined by one or more gestures. For example, the virtual boundary 144 may pass through points defined by positions of the user's hands.

At block 804, the method 800 comprises: processing sensor data 112 to generate a response event when there is a change in a portion of the monitored scene space 140 relative to the virtual boundary 144 in the corresponding monitoring space 140.

At block 806, the method 800 comprises: recognizing a first hand gesture 149 relating to a first hand $152_1$ of a user in the monitored scene space 140 and in response to recognizing the first hand gesture 149 in the monitored scene space 140 in relation to a portion of the virtual boundary 144 enabling user location of the portion of the implemented computer-implemented virtual boundary 144.

At block 808, the method 800 comprises: recognizing a second hand gesture 151 relating to a second hand $152_2$ of the user in the monitored scene space 140 and in response to recognizing the second hand gesture 151 in the monitored scene space 140 performing a command relating to a user located portion of the computer-implemented virtual boundary 144.

Where a structural feature has been described, it may be replaced by means for performing one or more of the functions of the structural feature whether that function or those functions are explicitly or implicitly described.

Examples of the disclosure provide for an easy and intuitive way to define virtual boundaries for a surveillance system.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
   causing computer implementation of at least one virtual boundary in a monitoring space corresponding to a monitored scene space;
   processing sensor data to generate a response event when there is, relative to the at least one computer-implemented virtual boundary, a change in a portion of the monitored scene space;
   recognizing a first predetermined discovery hand gesture relating to a first hand of a user in the monitored scene space in relation to a portion of the at least one computer-implemented virtual boundary;
   in response to recognizing the first predetermined discovery hand gesture, enabling user location of the portion of the at least one computer-implemented virtual boundary, where enabling user location of the portion of the at least one computer-implemented virtual boundary comprises at least one of:
      providing feedback to the user when the first hand of the user in the monitored scene space is at the at least one computer-implemented virtual boundary in the corresponding monitoring space, or
      providing user guidance to locate the first hand of the user in the monitored scene space at the at least one computer-implemented virtual boundary in the corresponding monitoring space;
   recognizing a second predetermined command hand gesture relating to a second hand of the user in the monitored scene space; and
   in response to recognizing the second predetermined command hand gesture in the monitored scene space, performing a command relating to the at least one computer-implemented virtual boundary.

2. The method as claimed in claim 1, further comprising recognizing the second predetermined command hand gesture as part of a two-handed gesture in the monitored scene space, wherein the two-handed gesture comprises the first predetermined discovery hand gesture and the second predetermined command hand gesture.

3. The method as claimed in claim 2, wherein the command is dependent upon the two-handed gesture.

4. The method as claimed in claim 1, wherein the command is dependent upon a state of the first hand, concurrent with the second predetermined command hand gesture.

5. The method as claimed in claim 1, wherein in response to recognizing, in the monitored scene space, a two-handed gesture in which the first predetermined discovery hand gesture maintains the first hand in a first state and stationary during the second predetermined command hand gesture, different to the first predetermined discovery hand gesture, in which the second hand is in a second state and moving, performing a first command relating to the at least one computer-implemented virtual boundary.

6. The method as claimed in claim 1, wherein, in response to recognizing, in the monitored scene space, a two-handed gesture in which the first predetermined discovery hand gesture maintains the first hand in a second state during the second predetermined command hand gesture, performing a second command relating to the at least one computer-implemented virtual boundary that is dependent on the second predetermined command hand gesture.

7. The method as claimed in claim 1, wherein the command is
   an information command that causes the user to receive information relating to the at least one computer-implemented virtual boundary or
   a boundary adaptation command that enables the user to adapt the at least one computer-implemented virtual boundary.

8. The method as claimed in claim 1, wherein the command is a boundary adaptation command that enables the user to adapt the at least one computer-implemented virtual boundary, where the adaptation comprises modifying the at least one computer-implemented virtual boundary, the method further comprising:
   processing the sensor data to generate a further response event when there is, relative to the modified at least one computer-implemented virtual boundary, a change in a second portion of the monitored scene space.

9. The method as claimed in claim 8, wherein the boundary adaptation command enables the user to adapt the at least one computer-implemented virtual boundary, where the adaptation comprises modifying one or more of:
   a shape of the at least one computer-implemented virtual boundary,
   a position of the at least one computer-implemented virtual boundary, or
   an orientation of the at least one computer-implemented virtual boundary.

10. The method as claimed in claim 1, wherein the command is a boundary adaptation command that enables the user to adapt the at least one computer-implemented virtual boundary, where the adaptation comprises deleting the at least one computer-implemented virtual boundary.

11. The method as claimed in claim 1, wherein the first hand is used consistently for boundary location and selection and wherein the second hand is used consistently for effecting commands.

12. The method as claimed in claim 1, wherein the computer implementation of the at least one virtual boundary is caused in response to recognizing a hand gesture performed by the user in the monitored scene space.

13. An apparatus comprising:
   at least one processor; and
   at least one non-transitory memory including computer program code, wherein the at least one non-transitory memory and the computer program code are configured, with the at least one processor, to cause the apparatus at least to:

cause implementation of at least one virtual boundary in a monitoring space corresponding to a monitored scene space;

process sensor data to generate a response event when there is, relative to the at least one implemented virtual boundary, a change in a portion of the monitored scene space;

recognize a first predetermined discovery hand gesture relating to a first hand of a user in the monitored scene space in relation to a portion of the at least one implemented virtual boundary;

in response to recognition of the first predetermined discovery hand gesture, enable user location of the portion of the at least one implemented virtual boundary, where enabling user location of the portion of the at least one implemented virtual boundary comprises at least one of:

provide feedback to the user when the first hand of the user in the monitored scene space is at the at least one implemented virtual boundary in the corresponding monitoring space, or provide user guidance to locate the first hand of the user in the monitored scene space at the at least one implemented virtual boundary in the corresponding monitoring space;

recognize a second predetermined command hand gesture relating to a second hand of the user in the monitored scene space; and in response to recognition of the second predetermined command hand gesture in the monitored scene space, perform a command relating to the at least one implemented virtual boundary.

14. A non-transitory computer readable medium comprising program instructions for causing an apparatus to perform at least the following:

cause implementation of at least one virtual boundary in a monitoring space corresponding to a monitored scene space;

process sensor data to generate a response event when there is, relative to the at least one computer-implemented virtual boundary, a change in a portion of the monitored scene space;

recognize a first predetermined discovery hand gesture relating to a first hand of a user in the monitored scene space in relation to a portion of the at least one computer-implemented virtual boundary;

in response to recognition of the first predetermined discovery hand gesture, enable user location of the portion of the at least one computer-implemented virtual boundary, where enabling user location of the portion of the at least one computer-implemented virtual boundary comprises at least one of:

provide feedback to the user when the first hand of the user in the monitored scene space is at the at least one computer-implemented virtual boundary in the corresponding monitoring space, or provide user guidance to locate the first hand of the user in the monitored scene space at the at least one computer-implemented virtual boundary in the corresponding monitoring space;

recognize a second predetermined command hand gesture relating to a second hand of the user in the monitored scene space; and in response to recognition of the second predetermined command hand gesture in the monitored scene space, perform a command relating to the at least one computer-implemented virtual boundary.

15. The apparatus as claimed in claim 13, further configured to recognize the second predetermined command hand gesture as part of a two-handed gesture in the monitored scene space, wherein the two-handed gesture comprises the first predetermined discovery hand gesture and the second predetermined command hand gesture.

16. The apparatus as claimed in claim 13, wherein the command is a boundary adaptation command that enables the user to adapt the at least one implemented virtual boundary, where the adaptation comprises modifying the at least one implemented virtual boundary, where the apparatus is further configured to:

process the sensor data to generate a further response event when there is, relative to the modified at least one implemented virtual boundary, a change in a second portion of the monitored scene space.

17. The apparatus as claimed in claim 16, wherein the boundary adaptation command enables the user to adapt the at least one implemented virtual boundary, where the adaptation comprises modifying one or more of:

a shape of the at least one implemented virtual boundary, a position of the at least one implemented virtual boundary, or an orientation of the at least one implemented virtual boundary.

18. The non-transitory computer readable medium in claim 14, comprising program instructions for causing the apparatus to perform at least the following:

recognize the second predetermined command hand gesture as part of a two-handed gesture in the monitored scene space, wherein the two-handed gesture comprises the first predetermined discovery hand gesture and the second predetermined command hand gesture.

19. The non-transitory computer readable medium of claim 14, wherein the command is a boundary adaptation command that enables the user to adapt the at least one computer-implemented virtual boundary, where the adaptation comprises modifying the at least one computer-implemented virtual boundary, comprising program instructions for causing the apparatus to perform at least the following:

process the sensor data to generate a further response event when there is, relative to the modified at least one computer-implemented virtual boundary, a change in a second portion of the monitored scene space.

20. The non-transitory computer readable medium claim 19, wherein the boundary adaptation command enables the user to adapt the at least one computer-implemented virtual boundary, where the adaptation comprises modifying one or more of:

a shape of the at least one computer-implemented virtual boundary, a position of the at least one computer-implemented virtual boundary, or an orientation of the at least one computer-implemented virtual boundary.

* * * * *

UNITED STATES PATENT AND TRADEMARK OFFICE
CERTIFICATE OF CORRECTION

| | |
|---|---|
| PATENT NO. | : 10,540,543 B2 |
| APPLICATION NO. | : 15/577901 |
| DATED | : January 21, 2020 |
| INVENTOR(S) | : Arto Lehtiniemi |

It is certified that error appears in the above-identified patent and that said Letters Patent is hereby corrected as shown below:

In the Claims

In Claim 18:
Column 24, Line 33, "in" should be deleted and -- of -- should be inserted.

In Claim 20:
Column 24, Line 52, "medium claim" should be deleted and -- medium of claim -- should be inserted.

Signed and Sealed this
Third Day of September, 2024

Katherine Kelly Vidal
*Director of the United States Patent and Trademark Office*